United States Patent [19]

Kotani et al.

[11] Patent Number: 5,851,682
[45] Date of Patent: Dec. 22, 1998

[54] POLYOLEFIN RESIN COMPOSITION AND RESIN FILM

[75] Inventors: Kozo Kotani, Osaka; Hideo Negawa, Shiga; Taiichi Sakaya, Osaka; Makoto Nakagahara, Osaka; Aki Kudo, Osaka, all of Japan

[73] Assignee: Sumitomo Chemical Company, Limited, Osaka, Japan

[21] Appl. No.: 537,691

[22] PCT Filed: Feb. 23, 1995

[86] PCT No.: PCT/JP95/00261

§ 371 Date: Dec. 11, 1995

§ 102(e) Date: Dec. 11, 1995

[87] PCT Pub. No.: WO95/23186

PCT Pub. Date: Aug. 31, 1995

[30] Foreign Application Priority Data

Feb. 28, 1994 [JP] Japan ..................................... 6-030072
Jul. 8, 1994 [JP] Japan ..................................... 6-157398

[51] Int. Cl.$^6$ ................................ B32B 27/00; C08J 5/17
[52] U.S. Cl. .......................... 428/500; 428/516; 524/251; 524/437
[58] Field of Search .................................... 524/251, 437; 428/500, 516

[56] References Cited

U.S. PATENT DOCUMENTS 5,063,264  11/1991  Nakajima ................................ 524/251

FOREIGN PATENT DOCUMENTS 0 429 731 A1  6/1991  European Pat. Off. .
0 549 340 A1  6/1993  European Pat. Off. .

OTHER PUBLICATIONS

Database WPI, Derwent Publications Ltd., London, GB; AN 88–240205 XP002003864 & JP–A–63 175 072 (Mikado Kako), Jul. 19, 1988—Abstract.

*Primary Examiner*—Peter D. Mulcahy
*Attorney, Agent, or Firm*—Birch, Stewart, Kolasch & Birch, LLP

[57] ABSTRACT

A polyolefin resin composition containing (a) 100 wt. parts of a polyolefin resin, (b) 0.03 to 60 wt. parts of an inorganic compound of the formula: $[Li^+Al^3{}^+{}_2(OH^-)_6].A^{n-}{}_{1/n}.mH_2O$ (I) in which $A^{n-}$ represents a n-valent anion, n is an integer of 1 to 4, and m is a number satisfying $0 \leq m \leq 3$ and (c) 0.02 to 5 wt. parts of a hindered amine compound, and a resin film made of a polyolefin resin composition containing (a) 100 wt. parts of a polyolefin resin, (b) 0.03 to 25 wt. parts of an inorganic compound of the above formula (I) and (c) 0.02 to 5 wt. parts of a hindered amine compound are disclosed. The resin composition and resin film are excellent in weather resistance.

11 Claims, No Drawings

POLYOLEFIN RESIN COMPOSITION AND RESIN FILM

FIELD OF THE INVENTION

The present invention relates to a polyolefin resin composition and a resin film comprising the same. In particular, the present invention relates to a polyolefin resin composition which is excellent in weather resistance and thermal stability, and a resin film comprising the same which is excellent in weather resistance.

BACKGROUND ART

Over the years, the amount of the resins which are used outdoors and as automobile materials, construction materials, agricultural materials, etc. has rapidly increased.

Resins used outdoors have required weather resistance among properties. For example, an agricultural film is one agricultural material that is used in a green house or tunnel used in horticulture. Since a polyolefin resin film which is generally used as such an agricultural film, such as for example, a polyethylene film, or an ethylene-vinyl acetate copolymer film suffers from deterioration of a retention rate of elongation or tensile strength caused by an oxidation reaction when it is exposed the sun light in an air, improvement of its weather resistance is required. To fulfil this requirement, resin compositions or resin films containing various weathering stabilizers have been developed.

Among the various weathering stabilizers, hindered amine compounds are preferably used, since they can greatly suppress the deterioration of the physical properties of the resin compositions upon exposure to the outdoor conditions and the change of gloss or color tone, by the addition of a small amount (for example, Japanese Patent KOKAI Publication No. 86645/1984 corresponding to EP-A-107615 and U.S. Pat. No. 5,102,927, and Japanese Patent KOKAI Publication No. 167350/1990 corresponding to EP-A-389 640). Japanese Patent KOKAI Publication No. 41254/1981 discloses a thermoplastic resin film containing a hindered amine compound and inorganic fine particles which have a polarity and a surface area of 10 m²/g or larger.

However, the above resin compositions containing the hindered amine compounds and the resin composition containing the hindered amine compound and the specific inorganic compound do not satisfactorily solve the problems of the deterioration of the compositions and the color change under the conditions during practical use (e.g. exposure to oxygen in the air, sun light, agrochemicals, acidic rain, etc.) or molding and processing conditions.

SUMMARY OF THE INVENTION

An object of the present invention is to provide a resin composition and a resin film which solve the above problems, in particular, a polyolefin resin composition having good weather resistance, and a resin film having good weather resistance and strength.

According to a first aspect of the present invention, there is provided a polyolefin resin composition comprising (a) 100 wt. parts of a polyolefin resin, (b) 0.03 to 60 wt. parts of an inorganic compound of the formula:

$$[Li+Al^3+_2(OH-)_6] \cdot A^{n-}{}_{1/n} \cdot mH_2O \qquad (I)$$

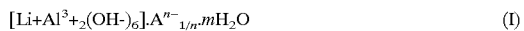

wherein $A^{n-}$ represents a n-valent anion, n is an integer of 1 to 4, and m is a number satisfying $0 \leq m \leq 3$, and (c) 0.02 to 5 wt. parts of a hindered amine compound.

According to a second aspect of the present invention, there is provided a resin film comprising a polyolefin resin composition which comprises (a) 100 wt. parts of a polyolefin resin, (b) 0.03 to 25 wt. parts of an inorganic compound of the formula:

$$[Li+Al^3+_2(OH)_6] \cdot A^{n-}{}_{1/n} \cdot mH_2O \qquad (I)$$

wherein $A^{n-}$ represents a n-valent anion, n is an integer of 1 to 4, and m is a number satisfying $0 \leq m \leq 3$, and (c) 0.02 to 5 wt. parts of a hindered amine compound.

DETAILED DESCRIPTION OF THE INVENTION

The present invention will be explained in detail.

The polyolefin resin (a) which constitutes the resin composition and the resin film of the present invention includes a homopolymer of an α-olefin, and a copolymer of different monomers comprising an α-olefin as a main component. Examples of the homopolymer are polyethylene, polypropylene, etc., and examples of the copolymer are ethylene/α-olefin copolymers such as ethylene/1-butene copolymer, ethylene/4-methyl-1-pentene copolymer, ethylene/1-hexene copolymer, etc.; ethylene-vinyl acetate copolymer; ethylene/acrylic acid copolymer; ethylene/methyl methacrylate copolymer; ethylene/vinyl acetate/methyl methacrylate copolymer; ionomer resins; and the like.

In the resin film of the present invention, polyethylene, the ethylene/α-olefin copolymers, and the ethylene/vinyl acetate copolymer containing 25 wt. % or less of vinyl acetate are preferred, in view of transparency, weather resistance, and so on.

The monovalent to tetravalent anions represented by $A^{n-}$ the formula (I) which represents the inorganic compound (b) to be contained in the resin composition and the resin film of the present invention are not limited. Preferred examples of the anion are Cl—, Br—, I—, $NO_3$—, $ClO_4$—, $SO_4{}^{2-}$, $CO_3{}^{2-}$, $SiO_3{}^{2-}$, $HPO_4{}^{2-}$, $HBO_4{}^{3-}$, $PO_4{}^{3-}$, $Fe(CN)_6{}^{3-}$, $Fe(CN)_6{}^{4-}$, $CH_3COO$—, terephthalate ion, naphthalanesulfonate ion, and so on.

Preferably, an average particle size of the inorganic compound is 5 μm or less, in particular, from 0.05 to 2 μm. Such inorganic compound may be prepared by the method described in Japanese Patent KOKAI Publication No. 179052/1993 (corresponding to EP-A-549 340 and U.S. Pat. Nos. 5,356,567 and 5,360,859). The inorganic compound may be surface treated with a higher fatty acid, an alkali metal salt of a higher aliphatic acid, and so on, to improve the dispersibility of the inorganic compound in the resin composition.

A content of the component (b) in the resin composition of the present invention is from 0.03 to 60 wt. parts per 100 wt. parts of the component (a).

In view of the transparency and strength of the film, the content of the component (b) in the resin composition constituting the resin film of the present invention is usually from 0.01 to 25 wt. parts, preferably from 1 to 10 wt. parts per 100 wt. parts of the component (a). When the content of the component (b) is less than 0.01 wt. part, the weather resistance is insufficient, while when it exceeds 25 wt. parts, the transparency and strength of the film are insufficient.

The hindered amine compound (c) is a 2,2,6,6-tetraalkyl piperidine derivative having a substituent at the 4-position, and preferably has a molecular weight of 250 or larger. Examples of the substituent at the 4-position are an carboxyl group, an alkoxy group, an alkylamino group, and so on. Further, a N-position may be substituted by an alkyl group. Preferred examples of such hindered amine compound are the following compounds (1) to (22):
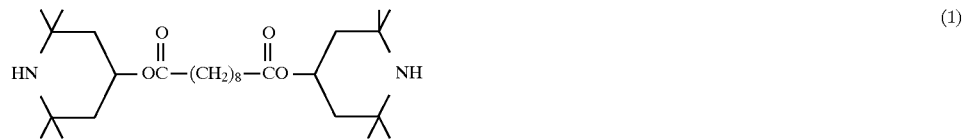
(1)
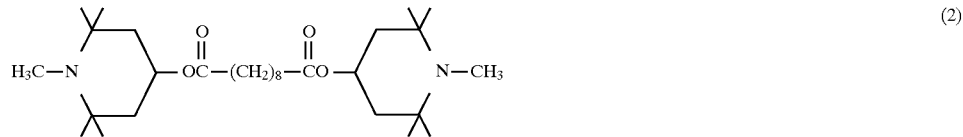
(2)
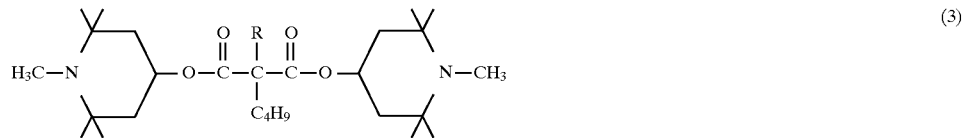
(3)
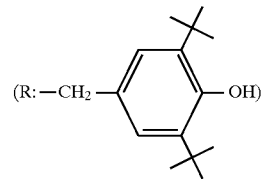
(4)
(5)
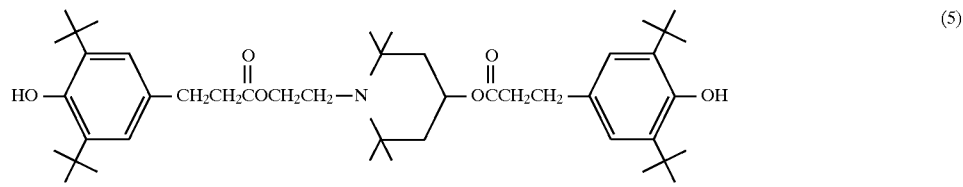
(6)
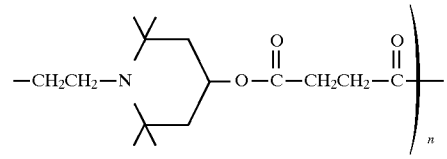
(7)
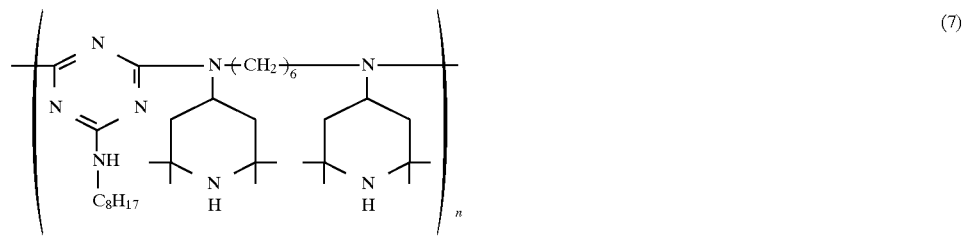

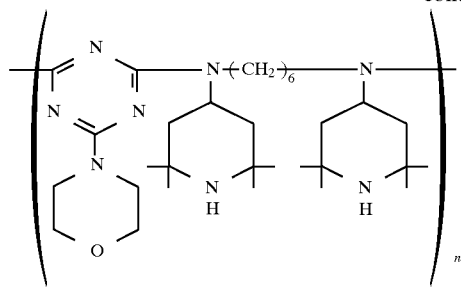
(8)
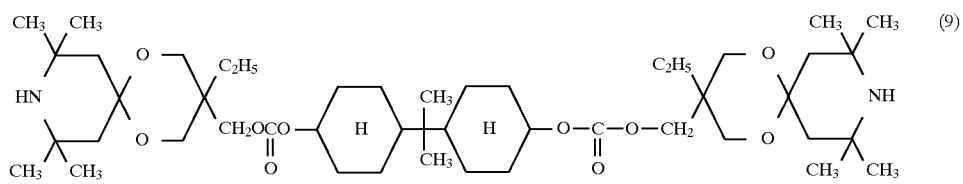
(9)
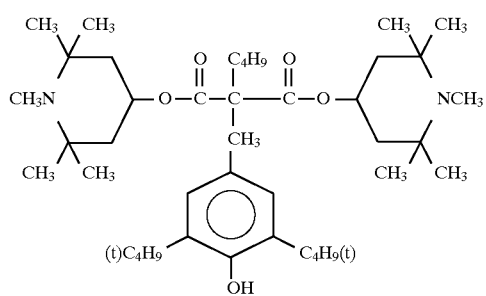
(10)
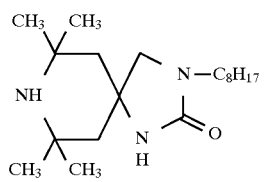
(11)
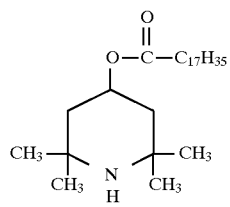
(12)
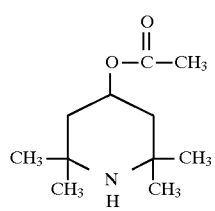
(13)
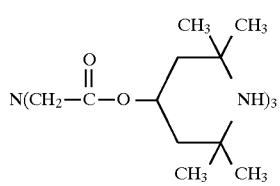
(14)

-continued
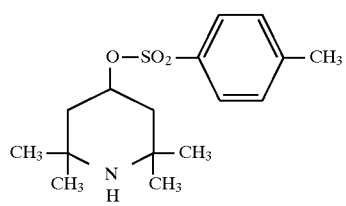
(15)
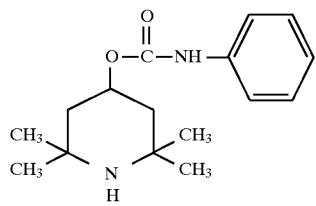
(16)
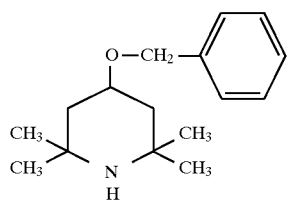
(17)
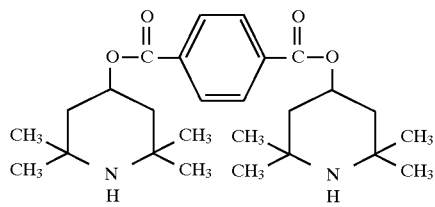
(18)
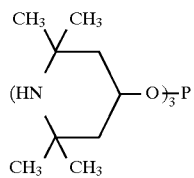
(19)
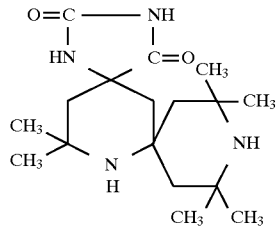
(20)
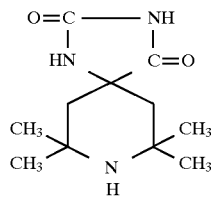
(21)
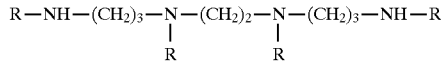
(22)

R:H or 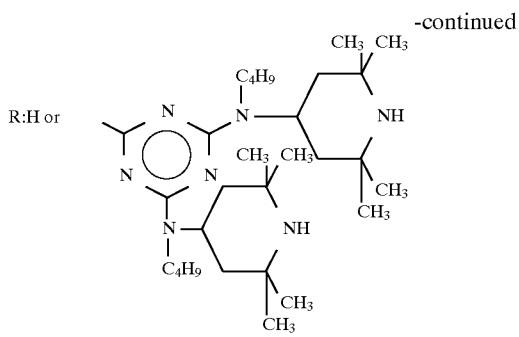

A content of the component (c) in the resin composition and the resin film of the present invention is usually from 0.02 to 5 wt. parts, preferably from 0.1 to 2 wt. parts per 100 wt. parts of the component (a). When the content of the component (c) is less than 0.02 wt. parts, the weather resistance is insufficient, while when it exceeds 5 wt. parts, blooming sometimes occurs. The hindered amine compounds of the component (c) may be used independently or as a mixture of two or more of them.

The resin composition and the resin film of the present invention may contain a UV light absorber to further improve the weather resistance. The UV light absorbers are roughly classified into benzotriazole UV light absorbers, benzoate UV light absorbers, and cyanoacrylate UV light absorbers. Examples of the UV light absorbers are the following compounds (23) to (31):

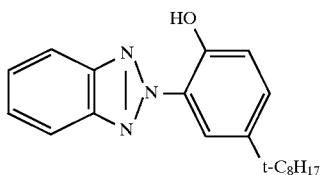 (23)

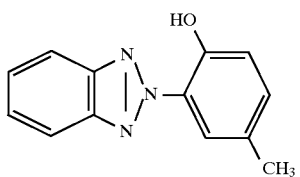 (24)

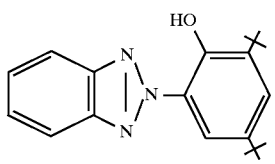 (25)

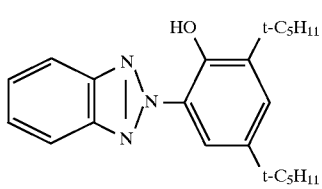 (26)

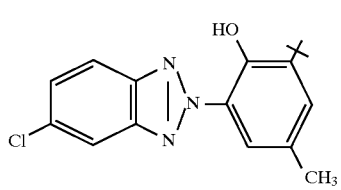 (27)

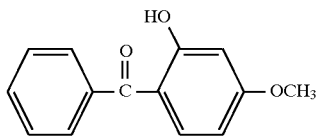 (28)

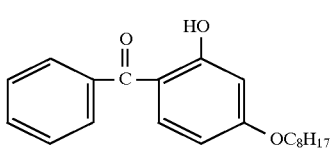 (29)

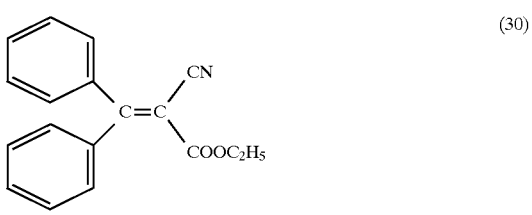 (30)

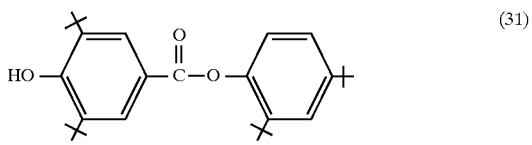 (31)

The UV light absorbers may be used independently or as a mixture of two or more of them.

An amount of the UV light absorber to be contained in the resin composition and the resin film of the present invention is 5 wt. parts or less, preferably from 0.01 to 5 wt. parts, more preferably from 0.05 to 1 wt. part per 100 wt. parts of the component (a). When the amount of the UV light absorber is less than 0.01 wt. part, the weather resistance may not be sufficiently improved, while when it exceeds 5 wt. parts, the blooming sometimes occurs.

The resin composition and the resin film of the present invention may contain various stabilizers which are generally added to resin compositions, for example, a light stabilizer such as a nickel compound, an antioxidant, an antistatic agent, a lubricant, an anti-fogging agent, a pigment, a flame-retardant, etc.

The resin composition and the resin film may contain an anti-fogging agent such as a nonionic surfactant, for example, sorbitan fatty acid ester surfactants (e.g. sorbitan monostearate, sorbitan monopalmitate, etc.), glycerin fatty acid ester surfactants (e.g. glycerin monolaurate, glycerin monopalmitate, glycerin monostearate, diglycerin distearate, triglycerin monostearate, etc.), polyethylene glycol base surfactants (e.g. polyethylene glycol monopalmitate, polyethylene glycol monostearate, etc.), alkylene oxide additives of alkylphenols, esters of sorbitan/glycerin condensates and organic acids, and so on.

The resin composition of the present invention may contain an inorganic compound other than the component (b). Also the resin film of the present invention may contain an inorganic compound other than the component (b) in an amount such that heat retaining properties and transparency of the film are not deteriorated. As the inorganic compound which may be contained in the resin composition and the resin film, there are exemplified oxides, hydroxides, carbonates, sulfates, phosphates, silicates, aluminates, aluminosilicates of metals such as lithium, sodium, potassium, magnesium, calcium, zinc, aluminum, silicon, titanium, etc., and double salts such as hydrotalcite compounds.

The resin composition of the present invention may be prepared by mixing the components (a), (b) and (c) and other additives for the resin in a mixer which is used in the preparation of the conventional resin composition such as a roll mill, a super mixer, a Banbury mixer, a single or twin-screw extruder and the like. Alternatively, the resin composition of the present invention may be prepared by first preparing a high concentration master batch of the components (b) and/or (c) in the component (a) as a medium, and then mixing the master batch with the component (a) or other additives.

The resin film of the present invention may be produced by forming the resin composition which has been prepared as explained above in the form of a film by a conventional method such as calendering, T-die extrusion, inflation molding, and the like.

The resin film of the present invention includes a single layer film of the resin composition of the present invention, and also a multi-layer film comprising at least two resin compositions of the present invention having different compositions, or a multi-layer film comprising a layer of the resin composition of the present invention and a layer of other resin composition. As the multi-layer film, there are exemplified a two-kind two-layer film, two-kind three-layer film, a three-kind three-layer film, and so on. The multi-layer film may be produced by T-die extrusion, inflation molding, the like.

Preferably, the resin film of the present invention is formed to have a thickness of 0.01 to 0.3 mm, in particular, from 0.03 to 0.2 mm. When the film thickness is less than 0.01 mm, the film strength is insufficient, while it is larger than 0.3 mm, joining of the films, or covering of the film is difficult.

Now, examples relating to the resin composition and the resin film of the present invention will be explained, but the present invention will not be limited by them.

EXAMPLES

In Examples 1–9 and Comparative Examples 1–18, the weathering test and the thermal stability test were carried out as follows:

Weathering Test (1)

A molded test piece of the resin composition having a thickness of 1 mm was maintained at an air-blowing temperature of 60° C. at a relative humidity of 32% for 18 hours using EYESUPER UV TESTER (Type: SUV-W11 manufactured by Eye Graphics Co., Ltd.). The test specimen was examined by naked eyes and a degree of coloring was ranked according to the following criteria:

○: Not colored.

Δ: Slightly colored yellow.

X: Colored yellow.

XX: Colored brown.

Weathering Test (2)

A molded test piece of the resin composition having a thickness of 1 mm was suspended in a 500 cc glass bottle containing 40 cc of a 6% aqueous solution of sulfurous acid while the test piece did not touch the aqueous solution. After closing the bottle, it was kept standing at 40° C. for 4 hours. Thereafter, the test piece was removed from the bottle, and maintained at an air-blowing temperature of 60° C. at a relative humidity of 32% for 18 hours using the above EYESUPER UV TESTER. The test specimen was examined by naked eyes and a degree of coloring was ranked according to the following criteria:

○: Not colored.

Δ: Slightly colored yellow.

X: Colored yellow.

XX: Colored brown.

Thermal Stability Test

A molded test piece of the resin composition having a thickness of 1 mm was maintained in a Geer oven at 180° C. in an air. Every one hour, the test piece was removed from the oven and examined by naked eyes, and a degree of coloring was ranked according to the following criteria:

○: Not colored.

Δ: Slightly colored yellow or pink.

X: Colored yellow or pink.

XX: Colored brown.

Example 1

Low density polyethylene (trade name: SUMIKATHEN F208-0 manufactured by Sumitomo Chemical Co., Ltd. Melt index=1.5 g/10 min. Density=0.92 g/cm$^3$) (100 wt. parts), a 2,2,6,6-tetraalkylpiperidine derivative (hereinafter referred to as "HALS"), (CIMASSORB 944-LD manufactured by Ciba-Geigy) (0.08 wt. part), and MIZUKALAC ([Li+Al$^{3+}$$_2$(OH-)$_6$]$_2$.CO$_3^{2-}$-manufactured by Mizusawa Chemical Co., Ltd.) (8.0 wt. parts) were kneaded by a Banbury mixer at 140° C. for 5 minutes, and pelletized by an extruder to obtain pellets. The pellets were press molded to form a sheet having a thickness of 1 mm, and subjected to the weathering tests (1) and (2). As shown in Table 1, it had excellent weather resistance.

Example 2

In the same manner as in Example 1 except that a UV light absorber (trade name: SUMISORB 130 manufactured by Sumitomo Chemical Co., Ltd.) (0.08 wt. part) was further compounded, a sheet having a thickness of 1 mm was produced, and subjected to the weathering tests (1) and (2). As shown in Table 1, it had excellent weather resistance.

Comparative Examples 1–4

In the same manner as in Example 1 or 2 except that hydrotalcite (trade name: DHT-4A manufactured by Kyowa Chemical Industries, Ltd.) (8.0 wt. parts) or silicca (trade name: SNOW MARK SP-10 manufactured by Kinsei Matic Co., Ltd.) (8.0 wt. parts) in place of MIZUKALAC, a sheet having a thickness of 1 mm was produced, and subjected to the weathering tests (1) and (2). As shown in Table 1, it had poor weather resistance.

TABLE 1

| | Composition of Resin Composition (wt. parts) | | | Results of Weathering test | |
|---|---|---|---|---|---|
| | Resin | HALS | UV light absorber | Inorganic compound | (1) | (2) |
| Ex. 1 | A1 (100) | 0.08 | — | B1 (8.0) | ○ | ○ |
| Ex. 2 | A1 (100) | 0.08 | 0.08 | B1 (8.0) | ○ | ○ |
| C. Ex. 1 | A1 (100) | 0.08 | — | B2 (8.0) | ○ | ○–Δ |
| C. Ex. 2 | A1 (100) | 0.08 | 0.08 | B2 (8.0) | ○ | ○–Δ |
| C. Ex. 3 | A1 (100) | 0.08 | — | B3 (8.0) | ○ | ×× |
| C. Ex. 4 | A1 (100) | 0.08 | 0.08 | B3 (8.0) | ○ | ×× |

A1: SUMIKATHENE F208-0 (a low density polyethylene manufactured by Sumitomo Chemical Co., Ltd.) (MI: 1.5 g/10 min., density: 0.92 g/cm$^3$).
HALS: CIMASSORB 944-LD (manufactured by Ciba-Geigy).
UV light absorber: SUMISORB 130 (manufactured by Sumitomo Chemical Co., Ltd.)
B1: MIZUKALAC ([Li + Al$^3$ + $_2$(OH—)$_6$]$_2$.CO$_3^2$ - manufactured by Mizusawa Chemical Co., Ltd.).
B2: Hydrotalcite DHT-4A (manufactured by Kyowa Chemical Industries Ltd.).
B3: SNOW MARK SP-10 (silicon oxide manufactured by Kinsei Matic Co., Ltd.).

Examples 3–5

Low density polyethylene (SUMIKATHENE F208-0) (100 wt. parts), CIMASSORB 944-LD (0.08 wt. part) and MIZUKALAC of an amount shown in Table 2 were kneaded in the same manner as in Example 1, pelletized, and molded to obtain a sheet having a thickness of 1 mm. The sheet was subjected to the thermal stability test. As seen from Table 1, each composition had excellent thermal stability.

Comparative Examples 5–7

In the same manner as in Examples 3–5 except that hydrotalcite (DHT-4A) in an amount shown in Table 2 was used in place of MIZUKALAC, a sheet having a thickness of 1 mm was produced, and subjected to the thermal stability test. As seen from Table 3, each composition had poor thermal stability.

Comparative Examples 8–10

In the same manner as in Examples 3–5 except that silicon oxide (SNOW MARK SP-10) in an amount shown in Table 2 was used in place of MIZUKALAC, a sheet having a thickness of 1 mm was produced, and subjected to the thermal stability test. As seen from Table 3, each composition had poor thermal stability.

TABLE 2

| | Composition of resin composition (wt. parts) | | |
|---|---|---|---|
| | Resin | HALS | Inorganic compound |
| Ex. 3 | A1 (100) | 0.08 | B1 (2.0) |
| Ex. 4 | A1 (100) | 0.08 | B1 (8.0) |
| Ex. 5 | A1 (100) | 0.08 | B1 (16.0) |
| C. Ex. 5 | A1 (100) | 0.08 | B2 (2.0) |
| C. Ex. 6 | A1 (100) | 0.08 | B2 (8.0) |
| C. Ex. 7 | A1 (100) | 0.08 | B2 (16.0) |
| C. Ex. 8 | A1 (100) | 0.08 | B3 (2.0) |
| C. Ex. 9 | A1 (100) | 0.08 | B3 (8.0) |
| C. Ex. 10 | A1 (100) | 0.08 | B3 (16.0) |

TABLE 3

| | Results of Thermal Stability Test (180° C.) | | | |
|---|---|---|---|---|
| | 1 hour | 2 hours | 3 hours | 5 hours |
| Ex. 3 | ○ | ○ | Δ | ×× |
| Ex. 4 | ○ | ○ | Δ | ×× |
| Ex. 5 | ○ | Δ | Δ–× | ×× |
| C. Ex. 5 | ○ | ○ | Δ–× | ×× |
| C. Ex. 6 | ○ | Δ | × | ×× |
| C. Ex. 7 | ○ | Δ | ×× | ×× |
| C. Ex. 8 | ○ | ○ | Δ–× | ×× |
| C. Ex. 9 | ○ | Δ | × | ×× |
| C. Ex. 10 | ○ | × | ×× | ×× |

Example 6

In the same manner as in Example 4 except that the same amount of an ethylene-vinyl acetate copolymer (trade name: EVATATE D2011 manufactured by Sumitomo Chemical Co., Ltd.) in place of the low density polyethylene (SUMIKATHENE F-208-0), a sheet having a thickness of 1 mm was produced and subjected to the thermal stability test. As seen from Table 5, it had excellent thermal stability.

Comparative Examples 11 and 12

In the same manner as in Example 6 except that the same amount of hydrotalcite (DHT-4A) or silicon oxide (SNOW MARK SP-10) was used in place of MIZUKALAC, a sheet having a thickness of 1 mm was produced and subjected to the thermal stability test. As seen from Table 5, each composition had poor thermal stability.

Example 7

In the same manner as in Example 4 except that the same amount of an ethylene-vinyl acetate copolymer (vinyl acetate content=5 wt. %. Melt Index=1.1 g/10 min. Density= 0.93 g/cm$^3$) in place of the low density polyethylene (SUMIKATHENE F-208-0), a sheet having a thickness of 1 mm was produced and subjected to the thermal stability test. As seen from Table 5, it had excellent thermal stability.

Comparative Examples 13 and 14

In the same manner as in Example 7 except that the same amount of hydrotalcite (DHT-4A) or silicon oxide (SNOW MARK SP-10) was used in place of MIZUKALAC, a sheet having a thickness of 1 mm was produced and subjected to the thermal stability test. As seen from Table 5, each composition had poor thermal stability.

TABLE 4

| | Composition of resin composition (wt. parts) | | |
|---|---|---|---|
| | Resin | HALS | Inorganic compound |
| Ex. 6 | A2 (100) | 0.08 | B1 (8.0) |
| C. Ex. 11 | A2 (100) | 0.08 | B2 (8.0) |
| C. Ex. 12 | A2 (100) | 0.08 | B3 (8.0) |
| Ex. 7 | A3 (100) | 0.08 | B1 (8.0) |

TABLE 4-continued

| | Composition of resin composition (wt. parts) | | |
|---|---|---|---|
| | Resin | HALS | Inorganic compound |
| C. Ex. 13 | A3 (100) | 0.08 | B2 (8.0) |
| C. Ex. 14 | A3 (100) | 0.08 | B3 (8.0) |

A2: EVATATE D2011 (Ethylene-vinyl acetate copolymer manufactured by Sumitomo Chemical Co., Ltd. Vinyl acetate content: 5 wt. %. MI: 2 g/10 min. Density: 0.93 g/cm$^3$).
A3: Ethylene-vinyl acetate copolymer (Vinyl acetate content: 15 wt. %. MI: 1.1 g/10 min. Density: 0.94 g/cm$^3$).

TABLE 5

| | Results of Thermal Stability Test (180° C.) | | | |
|---|---|---|---|---|
| | 1 hour | 2 hours | 3 hours | 5 hours |
| Ex. 6 | ○ | ○ | Δ | Δ-× |
| C. Ex. 11 | ○ | Δ | Δ-× | ×× |
| C. Ex. 12 | ○ | ○ | × | ×× |
| Ex. 7 | ○ | ○ | Δ | Δ |
| C. Ex. 13 | ○ | Δ | × | ×× |
| C. Ex. 14 | ○ | ○ | × | ×× |

TABLE 6

| | Composition of resin composition | | | | |
|---|---|---|---|---|---|
| | Resin | HALS | Antioxidant | TGMS | Inorganic compound |
| Ex. 8 | A3 (100) | 0.08 | — | 2.5 | B1 (8.0) |
| Ex. 9 | A3 (100) | 0.08 | 0.08 | 2.5 | B1 (20.0) |
| C. Ex. 15 | A3 (100) | 0.08 | — | 2.5 | B2 (8.0) |
| C. Ex. 16 | A3 (100) | 0.08 | 0.08 | 2.5 | B2 (20.0) |
| C. Ex. 17 | A3 (100) | 0.08 | — | 2.5 | B3 (8.0) |
| C. Ex. 18 | A3 (100) | 0.08 | 0.08 | 2.5 | B3 (20.0) |

Antioxidant: IRGANOX 1010 (manufactured by Ciba-Geigy).
TGMS: Tetraglycerin monostearate.

TABLE 7

| | Results of Thermal Stability Test (180° C.) | | | |
|---|---|---|---|---|
| | 1 hour | 2 hours | 3 hours | 5 hours |
| Ex. 8 | ○ | ○ | ○-Δ | Δ |
| Ex. 9 | ○ | ○ | ○ | Δ |
| C. Ex. 15 | ○ | Δ | Δ-× | × |
| C. Ex. 16 | Δ | Δ-× | × | ×× |
| C. Ex. 17 | ○ | ○ | Δ | × |
| C. Ex. 18 | ○ | ○ | ○ | Δ-× |

Example 8

In the same manner as in Example 7 except that an antioxidant (trade name: IRGANOX 1010 manufactured by CibaGeigy) (0.2 wt. part) and tetraglycerin monostearate (2.5 wt. parts) were further compounded, a sheet having a thickness of 1 mm was produced, and subjected to the thermal stability test. As shown in Table 7, it had good thermal stability.

Example 9

In the same manner as in Example 8 except that an amount of MIZUKALAC was changed to 20.0 wt. parts, a sheet having a thickness of 1 mm was produced, and subjected to the thermal stability test. As shown in Table 7, it had good thermal stability.

Comparative Examples 15 and 16

In the same manner as in Example 8 or 9 except that hydrotalcite (DHT-4A) was used in place of MIZUKALAC, a sheet having a thickness of 1 mm was produced, and subjected to the thermal stability test. As shown in Table 7, each composition had poor thermal stability.

Comparative Examples 17 and 18

In the same manner as in Example 8 or 9 except that silicon oxide (SNOW MARK SP-10) was used in place of MIZUKALAC, a sheet having a thickness of 1 mm was produced, and subjected to the thermal stability test. As shown in Table 7, each composition had poor thermal stability.

In following Examples 10–21 and Comparative Examples 19–24, the weathering test was carried out as follows:

Weathering Test (3)

A test piece produced by blanking a resin film in the form of a JIS No. 1 dumbbell was dipped in an aqueous solution, which was prepared by diluting a lime-sulfur mixture (a 27.5% aqueous solution of calcium polysulfide manufactured by Hokko Chemical Industries, Ltd.) with six times volume of water, for 24 hours, followed by washing with water and drying. The test piece was exposed in a sunshine weather-O-meter (manufactured by Suga Shikenki Co., Ltd.) at a black panel temperature of 63° C. After a specified time, the test piece was removed and subjected to a tensile test using an Autograph DSS 100 (manufactured by Shimadzu Corporation). Then, an elongation expressed by the following formula was calculated:

Elongation (%)=[$(a-b)/b$]×100 in which "a" is a distance between standard lines at break, and "b" is a distance between standard lines.

With plural test pieces exposed in different times, the tensile test was carried out, and an exposure time at which the elongation decreased to a half of the original test piece was obtained (hereinafter referred to as a "half-life period of weather resistance"). The larger half-life period of weather resistance, the better weather resistance.

Example 10

An ethylene-vinyl acetate copolymer (Vinyl acetate content=15 wt. %. Melt index=1.1 g/10 min. Density=0.94 g/cm$^3$) (100 wt. parts), MIZUKALAC ([Li+Al$^3$+$_2$(OH-)$_6$]$_2$·CO$_3^{2-}$ manufactured by Mizusawa Chemical Co., Ltd.) (8.0 wt. parts), HALS (TINUVIN 622-LD manufactured by Ciba-Geigy) (0.6 wt. part), an antioxidant (trade name: IRGANOX 1010 manufactured by CibaGeigy) (0.1 wt. part), monoglycerin monostearate (an anti-fogging agent) (1.4 wt. parts), diglycerin distearate (an anti-fogging agent) (0.6 wt. part), and stearic acid amide (a lubricant) (0.2 wt. part) were kneaded by a Banbury mixer at 130° C. for 5 minutes, and pelletized by an pelletizer to obtain pellets of the resin composition. This was designated as Resin Composition (1).

Separately, an ethylene-vinyl acetate copolymer (trade name: EVATATE D2011 manufactured by Sumitomo Chemical Co., Ltd.) (100 wt. parts), TINUVIN 622-LD (0.6 wt. part), IRGANOX 1010 (0.1 wt. part), monoglycerin monostearate (1.4 wt. parts), diglycerin distearate (0.6 wt. part), and stearic acid amide (0.2 wt. part) were processed in the same manner as in the preparation of Resin Composition (1) to obtain pellets, which are designated as Resin Composition (2).

Using a blown-film extruder, a two-kind three-layer film consisting of an intermediate layer of Resin Composition (1) and outer layers of Resin Composition (2) and having a film thickness of 100 μm (a thickness of the intermediate layer= 0.06 mm. a thickness of each outer layer=0.02 mm) was formed. This film was subjected to the weathering test (3). As shown in Table 9, excellent weather resistance was found.

Example 11

In the same manner as in Example 10 except that a UV light absorber (trade name: SUMISORB 130 manufactured by Sumitomo chemical Co., Ltd.) (0.01 wt. part) was further compounded in each of Resin Compositions (1) and (2), a two-kind three-layer film was formed and subjected to the weathering test (3). As shown in Table 9, it had excellent weather resistance.

Example 12

In the same manner as in Example 10 except that SUMISORB 130 (0.01 wt. part) was further added to Resin Composition (1) or SUMISORB 130 (0.01 wt. part) and MIZUKALAC (2.0 wt. parts) were further compounded in Resin Composition (2), a two-kind three-layer film was formed and subjected to the weathering test (3). As shown in Table 9, it had excellent weather resistance.

Comparative Example 19

In the same manner as in Example 10 except that silicon oxide (trade name: SNOW MARK SP-10manufactured by Kinsei Matic Co., Ltd.) (10 wt. parts) was used in place of MIZUKALAC, a two-kind three-layer film was formed and subjected to the weathering test (3). As shown in Table 9, weather resistance was poor.

TABLE 8

| | Composition of resin composition of intermediate layer (wt. parts) | | | |
| --- | --- | --- | --- | --- |
| | HALS A | HALS B | UV light absorber | Inorganic compound |
| Ex. 10 | 0.60 | — | — | B1 (8.0) |
| Ex. 11 | 0.60 | — | 0.10 | B1 (8.0) |
| Ex. 12 | 0.60 | — | 0.10 | B1 (8.0) |
| C. Ex. 19 | 0.60 | — | — | B3 (10.0) |

HALS A: TINUVIN 622-LD (manufactured by Ciba-Geigy).
HALS B: CIMASSORB 944-LD (manufactured by Ciba-Geigy).
UV light absorber: SUMISORB 130 (manufactured by Sumitomo Chemical Co., Ltd.).

TABLE 9

| | Composition of resin composition of both outer layers (wt. parts) | | | | Half-life period of weathera- |
| --- | --- | --- | --- | --- | --- |
| | HALS A | HALS B | UV light absorber | Inorganic compound | bility (hrs) |
| Ex. 10 | 0.60 | — | — | — | 750 |
| Ex. 11 | 0.60 | — | 0.10 | — | >1100 |
| Ex. 12 | 0.60 | — | 0.10 | B1 (2.0) | >1100 |
| C. Ex. 19 | 0.60 | — | — | — | 480 |

Example 13

An ethylene-vinyl acetate copolymer (Vinyl acetate content=15 wt. %. Melt index=1.1 g/10 min. Density=0.94 g/cm$^3$) (100 wt. parts), MIZUKALAC (8.0 wt. parts), TINUVIN 622-LD (HALS) (0.35 wt. part), CIMASSORB 944-LD (HALS) (0.45 wt. part), SUMISORB 130 (an antioxidant) (0.1 wt. part), IRGANOX 1010 (an antioxidant) (0.1 wt. part), monoglycerin monostearate (an anti-fogging agent) (1.4 wt. parts), diglycerin distearate (an anti-fogging agent) (0.6 wt. part), and stearic acid amide (a lubricant) (0.2 wt. part) were kneaded by a Banbury mixer at 130° C. for 5 minutes, and pelletized by an pelletizer to obtain pellets of the resin composition. This was designated as Resin Composition (3).

Separately, an ethylene-vinyl acetate copolymer (trade name: EVATATE D2011 manufactured by Sumitomo Chemical Co., Ltd.) (100 wt. parts), TINUVIN 622-LD (0.8 wt. part), SUMISORB 130 (0.1 wt. part), IRGANOX 1010 (0.1 wt. part), monoglycerin monostearate (1.4 wt. parts), diglycerin distearate (0.6 wt. part), and stearic acid amide (0.2 wt. part) were processed in the same manner as in the preparation of Resin Composition (3) to obtain pellets, which are designated as Resin Composition (4).

Using a blown-film extruder, a two-kind three-layer film consisting of an intermediate layer of Resin Composition (3) and outer layers of Resin Composition (4) and having a film thickness of 100 μm (a thickness of the intermediate layer= 0.06 mm. a thickness of each outer layer=0.02 mm) was formed. This film was subjected to the weathering test (3). As shown in Table 11, it had excellent weather resistance.

Example 14

In the same manner as in Example 13 except that MIZUKALAC (2.0 wt. parts) was further compounded in Resin Composition (4), a two-kind three-layer film was formed and subjected to the weathering test (3). As shown in Table 11, it had excellent weather resistance.

Example 15

In the same manner as in Example 13 except that an amount of MIZUKALAC was changed to 2.0 wt. parts in Resin Composition (3), and silicon oxide (SNOW MARK SP-10) (10 wt. parts) was further compounded in Resin Composition (3), a two-kind three-layer film was formed and subjected to the weathering test (3). As shown in Table 11, it had excellent weather resistance.

Comparative Example 20

In the same manner as in Example 13 except that silicon oxide (SNOW MARK SP-10) (10 wt. parts) was used in place of MIZUKALAC, a two-kind three-layer film was formed and subjected to the weathering test (3). As shown in Table 11, weather resistance was poor.

Example 16

An ethylene-vinyl acetate copolymer (Vinyl acetate content=15 wt. %. Melt index=1.1 g/10 min. Density=0.94 g/cm$^3$) (100 wt. parts), MIZUKALAC (8.0 wt. parts), CIMASSORB 944-LD (HALS) (0.6 wt. part), IRGANOX 1010 (an antioxidant) (0.1 wt. part), monoglycerin monostearate (an anti-fogging agent) (1.4 wt. parts), diglycerin distearate (an anti-fogging agent) (0.6 wt. part), and stearic acid amide (a lubricant) (2.0 wt. parts) were kneaded by a Banbury mixer at 130° C. for 5 minutes, and pelletized by an pelletizer to obtain pellets of the resin composition. This was designated as Resin Composition (5).

Separately, an ethylene-vinyl acetate copolymer (trade name: EVATATE D2011 manufactured by Sumitomo Chemical Co., Ltd.) (100 wt. parts), MIZUKALAC (8.0 wt. parts), TINUVIN 622-LD (HALS) (0.35 wt. part), CIMASSORB (0.25 wt. part), SUMISORB 130 (a UV light absorber) (0.1 wt. part), IRGANOX 1010 (0.1 wt. part), monoglycerin monostearate (1.4 wt. parts), diglycerin distearate (0.6 wt. part), and stearic acid amide (0.2 wt. part) were processed in the same manner as in the preparation of Resin Composition (5) to obtain pellets, which are designated as Resin Composition (6).

Using a blown-film extruder, a two-kind three-layer film consisting of an intermediate layer of Resin Composition (5) and outer layers of Resin Composition (6) and having a film thickness of 100 μm (a thickness of the intermediate layer= 0.06 mm. a thickness of each outer layer=0.02 mm) was formed. This film was subjected to the weathering test (3). As shown in Table 11, it had excellent weather resistance.

Comparative Example 21

In the same manner as in Example 16 except that silicon oxide (SNOW MARK SP-10) (10 wt. parts) was used in place of MIZUKALAC, a two-kind three-layer film was formed and subjected to the weathering test (3). As shown in Table 11, weather resistance was poor.

TABLE 10

| | Composition of resin composition of intermediate layer (wt. parts) | | | |
|---|---|---|---|---|
| | HALS A | HALS B | UV light absorber | Inorganic compound |
| Ex. 13 | 0.35 | 0.45 | 0.10 | B1 (8.0) |
| Ex. 14 | 0.35 | 0.45 | 0.10 | B1 (8.0) |
| Ex. 15 | 0.35 | 0.45 | 0.10 | B1 (2.0) B3 (10.0) |
| C. Ex. 20 | 0.35 | 0.45 | 0.10 | B3 (10.0) |
| Ex. 16 | — | 0.60 | 0.10 | B1 (8.0) |
| C. Ex. 21 | — | 0.60 | 0.10 | B3 (10.0) |

TABLE 11

| | Composition of resin composition of both outer layers (wt. parts) | | | | Half-life period of weathera-bility (hrs) |
|---|---|---|---|---|---|
| | HALS A | HALS B | UV light absorber | Inorganic compound | |
| Ex. 13 | 0.80 | — | 0.10 | — | >1100 |
| Ex. 14 | 0.80 | — | 0.10 | B1 (2.0) | >1100 |
| Ex. 15 | 0.80 | — | 0.10 | — | 700 |
| C. Ex. 20 | 0.80 | — | 0.10 | — | 490 |

TABLE 11-continued

| | Composition of resin composition of both outer layers (wt. parts) | | | | Half-life period of weathera-bility (hrs) |
|---|---|---|---|---|---|
| | HALS A | HALS B | UV light absorber | Inorganic compound | |
| Ex. 16 | 0.35 | 0.25 | 0.10 | — | 830 |
| C. Ex. 21 | 0.35 | 0.25 | 0.10 | — | 470 |

Example 17

An ethylene-vinyl acetate copolymer (EVATATE D2011) (100 wt. parts), MIZUKALAC (8.0 wt. parts), TINUVIN 622-LD (0.6 wt. part), IRGANOX 1010 (an antioxidant) (0.1 wt. part), monoglycerin monostearate (an anti-fogging agent) (1.4 wt. parts), diglycerin distearate (an anti-fogging agent) (0.6 wt. part), and stearic acid amide (a lubricant) (0.2 wt. part) were kneaded by a Banbury mixer at 130° C. for 5 minutes, and pelletized by an pelletizer to obtain pellets of the resin composition.

Using a blown-film extruder, this resin composition was molded to obtain a film having a thickness of 75 μm and subjected to the weathering test (3). As shown in Table 12, it had excellent weather resistance.

Example 18

In the same manner as in Example 17 except that SUMISORB (a UV light absorber) (0.1 wt. part) was further compounded in the resin composition, a film was formed and subjected to the weathering test (3). As shown in Table 12, it had excellent weather resistance.

Comparative Example 22

In the same manner as in Example 17 except that silicon oxide (SNOW MARK SP-10) (10 wt. parts) was used in place of MIZUKALAC, a film was formed and subjected to the weathering test (3). As shown in Table 12, weather resistance was poor.

Example 19

An ethylene-vinyl acetate copolymer (EVATATE D2011) (100 wt. parts), MIZUKALAC (8.0 wt. parts), TINUVIN 622-LD (HALS) (0.35 wt. parts), CIMASSORB 944-LD (HALS) (0.45 wt. part), SUMISORB 130 (a UV light absorber) (0.1 wt. part), IRGANOX 1010 (an antioxidant) (0.1 wt. part), monoglycerin monostearate (an anti-fogging agent) (1.4 wt. parts), diglycerin distearate (an anti-fogging agent)( (0.6 wt. part), and stearic acid amide (a lubricant) (0.2 wt. part) were kneaded by a Banbury mixer at 130° C. for 5 minutes, and pelletized by an pelletizer to obtain pellets of the resin composition.

Using a blown-film extruder, this resin composition was molded to obtain a film having a thickness of 75 μm and subjected to the weathering test (3). As shown in Table 12, it had excellent weather resistance.

Example 20

In the same manner as in Example 19 except that an amount of MIZUKALAC was changed to 2.0 wt. parts, and silicon oxide (SNOW MARK SP-10) (10 wt. parts) was further added to the resin composition, a film was formed and subjected to the weathering test (3). As shown in Table 12, excellent weather resistance was found.

Comparative Example 23

In the same manner as in Example 19 except that silicon oxide (SNOW MARK SP-10) (10 wt. parts) was used in place of MIZUKALAC, a film was formed and subjected to the weathering test (3). As shown in Table 12, weather resistance was poor.

Example 21

An ethylene-vinyl acetate copolymer (EVATATE D2011) (100 wt. parts), MIZUKALAC (8.0 wt. parts), CIMAS-SORB 944-LD (HALS) (0.6 wt. part), SUMISORB 130 (a UV light absorber) (0.1 wt. part), IRGANOX 1010 (an antioxidant) (0.1 wt. part), monoglycerin monostearate (an anti-fogging agent) (1.4 wt. parts), diglycerin distearate (an anti-fogging agent)( (0.6 wt. part), and stearic acid amide (a lubricant) (0.2 wt. part) were kneaded by a Banbury mixer at 130° C. for 5 minutes, and pelletized by an pelletizer to obtain pellets of the resin composition.

Using a blown-film extruder, this resin composition was molded to obtain a film having a thickness of 75 μm and subjected to the weathering test (3). As shown in Table 12, it had excellent weather resistance.

Comparative Example 24

In the same manner as in Example 21 except that silicon oxide (SNOW MARK SP-10) (10 wt. parts) was used in place of MIZUKALAC, a film was formed and subjected to the weathering test (3). As shown in Table 12, weather resistance was poor.

TABLE 12

| | HALS A | HALS B | UV light absorber | Inorganic compound | Half-life period of weatherability (hrs) |
|---|---|---|---|---|---|
| Ex. 17 | 0.60 | — | — | B1 (8.0) | 600 |
| Ex. 18 | 0.60 | — | 0.10 | B1 (8.0) | >1000 |
| C. Ex. 22 | 0.60 | — | — | B3 (10.0) | 320 |
| Ex. 19 | 0.35 | 0.45 | 0.10 | B1 (8.0) | >1000 |
| Ex. 20 | 0.35 | 0.45 | 0.10 | B1 (2.0) B3 (10.0) | 520 |
| C. Ex. 23 | 0.35 | 0.45 | 0.10 | B3 (10.0) | 310 |
| Ex. 21 | — | 0.60 | 0.10 | B1 (8.0) | 750 |
| C. Ex. 24 | — | 0.60 | 0.10 | B3 (10.0) | 300 |

INDUSTRIAL APPLICABILITY OF THE INVENTION

Since the polyolefin rein composition of the present invention contains the specific inorganic compound (b) and the hindered amine compound (c), and then it has both excellent weather resistance and heat stability, it can find applications in a housing of an appliance, an automobile part, a construction material and an agricultural material.

Examples of the appliance are a washing machine, a video camera, an audio equipment, a telephone, and so on. Examples of the automobile part are exterior parts such as a bumper, a side mirror, etc., and interior parts such as an instrument panel, a side ornament, etc. Examples of the construction material are a concrete panel, a waterproof sheet, etc. Examples of the agricultural material are a malting film, a seed tray, a sprinkling hose, etc. In addition, the resin composition of the present invention may be used in wide variety of materials which are used outdoors such as a pallet, a drinking water container, etc.

Since the resin film of the present invention has excellent weather resistance, it is particularly useful as an agricultural film.

What is claimed is:

1. A polyolefin resin composition comprising
   (a) 100 wt. parts of a polyolefin resin,
   (b) 0.03 to 60 wt. parts of an inorganic compound of the formula:

$$[Li+Al^{3+}_{2}(OH-)_{6}].A^{n-}_{1/n}.mH_2O \quad (I)$$

wherein $A^{n-}$ represents a n-valent anion, n is an integer of 1 to 4, and m is a number satisfying $0 \leq m \leq 3$, and
   (c) 0.02 to 5 wt. parts of a hindered amine compound.

2. The resin composition according to claim 1, wherein a content of said component (b) is from 0.03 to 25 wt. parts.

3. The resin composition according to claim 1 or 2, which further comprises 0.01 to 5 wt. parts of a UV light absorber.

4. A resin film comprising a polyolefin resin composition which comprises
   (a) 100 wt. parts of a polyolefin resin,
   (b) 0.03 to 25 wt. parts of an inorganic compound of the formula:

$$[Li+Al^{3+}_{2}(OH-)_{6}].A^{n-}_{1/n}.mH_2O \quad (I)$$

wherein $A^{n-}$ represents a n-valent anion, n is an integer of 1 to 4, and m is a number satisfying $0 \leq m3$, and
   (c) 0.02 to 5 wt. parts of a hindered amine compound.

5. The resin film according to claim 4, wherein said resin composition further comprises 0.01 to 5 wt. parts of a UV light absorber.

6. A multi-layer film comprising at least one layer consisting of a polyolefin resin composition which comprises
   (a) 100 wt. parts of a polyolefin resin,
   (b) 0.03 to 25 wt. parts of an inorganic compound of the formula:

$$[Li+Al^{3+}_{2}(OH-)_{6}].A^{n-}_{1/n}. mH_2O \text{ tm (I)}$$

wherein $A^{n-}$ represents a n-valent anion, n is an integer of 1 to 4, and m is a number satisfying $0 \leq m \leq 3$, and
   (c) 0.02 to 5 wt. parts of a hindered amine compound.

7. The resin film according to claim 6, wherein said resin composition further comprises 0.01 to 5 wt. parts of a UV light absorber.

8. The resin film according to claim 4, wherein said polyolefin resin is selected from the group consisting of polyethylene, ethylene/α-olefin copolymer, and ethylene/vinyl acetate copolymer containing 25 wt. % or less of vinyl acetate.

9. The resin composition according to claim 1, wherein the n-valent anion is selected from the group consisting of Cl—, Br—, 1-, $NO_3$—, $ClO_4$—, $SO_42$—, $CO_32$—, $SiO_32$—, $HPO_42$—, $HBO_43$—, $PO_43$—, $Fe(CN)_43$—, $Fe(CN)_44$—, $CH_3COO$—, terephthalate ion, and naphthalene-sulfonate ion.

10. The resin film according to claim 4, wherein the n-valent anion is selected from the group consisting of Cl—, Br—, 1-, $NO_3$—, $ClO_4$—, $SO_42$—, $CO_32$—, $SiO_32$—, $HPO_42$—, $HBO_43$—, $PO_43$—, $Fe(CN)_43$—, $Fe(CN)_44$—, $CH_3COO$—, terephthalate ion, and naphthalene-sulfonate ion.

11. The multi-layer film according to claim 6, wherein the n-valent anion is selected from the group consisting of Cl—, Br—, 1-, $NO_3$—, $ClO_4$—, $SO_42$—, $CO_32$—, $SiO_32$—, $HPO_42$—, $HBO_43$—, $PO_43$—, $Fe(CN)_43$—, $Fe(CN)_44$—, $CH_3COO$—, terephthalate ion, and naphthalene-sulfonate ion.

* * * * *